United States Patent
Roper et al.

(10) Patent No.: US 10,774,220 B1
(45) Date of Patent: Sep. 15, 2020

(54) INORGANIC PASSIVE COATINGS FOR ATOMIC VAPOR CELLS

(71) Applicant: HRL Laboratories, LLC, Malibu, CA (US)

(72) Inventors: Christopher S. Roper, Oak Park, CA (US); Adam F. Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/173,316

(22) Filed: Oct. 29, 2018

Related U.S. Application Data

(60) Provisional application No. 62/656,604, filed on Apr. 12, 2018.

(51) Int. Cl.
| | |
|---|---|
| *H01S 1/06* | (2006.01) |
| *H03B 17/00* | (2006.01) |
| *C09D 1/00* | (2006.01) |
| *G01N 21/31* | (2006.01) |
| *G04F 5/14* | (2006.01) |

(52) U.S. Cl.
CPC ........... *C09D 1/00* (2013.01); *G01N 21/3103* (2013.01); *G04F 5/14* (2013.01)

(58) Field of Classification Search
CPC .......... C09D 1/00; G01N 21/3103; G04F 5/14
USPC .......................................... 331/3, 93.1, 94.1
See application file for complete search history.

(56) References Cited

U.S. PATENT DOCUMENTS

| | | |
|---|---|---|
| 3,578,834 A | 5/1971 | Porta et al. |
| 4,495,478 A | 1/1985 | Kwon et al. |
| 5,192,921 A | 3/1993 | Chantry et al. |

(Continued)

FOREIGN PATENT DOCUMENTS

| | | |
|---|---|---|
| WO | 1997012298 A1 | 4/1997 |
| WO | 2000043842 A2 | 2/2001 |

OTHER PUBLICATIONS

Author: Woetzel et al.; Title: Lifetime improvement of microfabricated alkali vapor cells by atomic layer deposited wall coatings; Date: Feb. 8, 2013; Publisher: Elsevier; Edition or Volume: Surface and Coatings Technology 221 (2013); Pertinent pp. 158-162 (Year: 2013).*

Svenja Knappe, MEMS Atomic Clocks, National Institute of Standards and Technology (NIST), Boulder, CO, USA Published by Elsevier B.V., Comprehensive Microsystems, vol. 3, pp. 571-612, 2007.

(Continued)

*Primary Examiner* — Richard Tan
(74) *Attorney, Agent, or Firm* — O'Connor & Company

(57) ABSTRACT

Some variations provide an atomic vapor-cell system comprising: a vapor-cell region configured with vapor-cell walls for containing an atomic vapor; and a coating disposed on at least some interior surfaces of the walls, wherein the coating comprises magnesium oxide, a rare earth metal oxide, or a combination thereof. The atomic vapor-cell system may be configured to allow at least one optical path through the vapor-cell region. In some embodiments, the coating comprises or consists essentially of magnesium oxide and/or a rare earth metal oxide. When the coating contains a rare earth metal oxide, it may be a lanthanoid oxide, such as lanthanum oxide. The atomic vapor-cell system preferably further comprises a device to adjust vapor pressure of the atomic vapor within the vapor-cell region. Preferably, the device is a solid-state electrochemical device configured to convey the atomic vapor into or out of the vapor-cell region.

28 Claims, 2 Drawing Sheets

(56) References Cited

U.S. PATENT DOCUMENTS

| | | | |
|---|---|---|---|
| 7,956,697 B2* | 6/2011 | Aoyama | H03L 7/26 331/3 |
| 8,009,520 B2 | 8/2011 | Jau et al. | |
| 8,258,884 B2 | 9/2012 | Borwick, III et al. | |
| 8,624,682 B2 | 1/2014 | Ridley et al. | |
| 8,999,123 B2 | 4/2015 | Bernstein et al. | |
| 9,064,942 B2 | 6/2015 | Bangsaruntip et al. | |
| 9,077,354 B2 | 7/2015 | Strabley et al. | |
| 9,685,483 B2 | 6/2017 | Nazarian et al. | |
| 9,763,314 B1* | 9/2017 | Roper | H05H 3/02 |
| 2011/0247942 A1 | 10/2011 | Bernstein et al. | |
| 2014/0227548 A1 | 8/2014 | Myrick | |
| 2015/0226669 A1 | 8/2015 | Compton | |
| 2015/0303640 A1* | 10/2015 | Dube | H01S 3/227 372/56 |
| 2019/0152773 A1* | 5/2019 | Herbsommer | B81C 1/00293 |

OTHER PUBLICATIONS

Jonathan J. Bernstein et al., "All Solid-State Ion-Conducting Cesium Source for Atomic Clocks," Solid State Ionics, vol. 198, No. 1, Sep. 2011.

Bernstein et al., "Solid State Electrochemical Alkali Sources for Cold Atom Sensing", Solid-State Sensors, Actuators and Microsystems Workshop, Hilton Head Island, South Carolina, Jun. 5-9, 2016.

Wan et al., "Study on the First-Principles Calculations of Graphite Intercalated by Alkali Metal (Li, Na, K)", Int. J. Electrochem. Sci., 10 (2015) 3177-3184.

Yi et al., "Method for characterizing self-assembled monolayers as antirelaxation wall coatings for alkali vapor cells" Journal of Applied Physics 104, 023534 (2008).

Stephens et al., "Study of wall coatings for vapor-cell laser traps" Journal of Applied Physics 76, 3479 (1994).

* cited by examiner

INORGANIC PASSIVE COATINGS FOR ATOMIC VAPOR CELLS

PRIORITY DATA

This patent application is a non-provisional application with priority to U.S. Provisional Patent App. No. 62/656,604, filed Apr. 12, 2018, which is hereby incorporated by reference herein.

STATEMENT REGARDING FEDERALLY SPONSORED RESEARCH OR DEVELOPMENT

This invention was reduced to practice with Government support under Contract No. FA8650-19-C-7903 awarded by the United States Air Force. The Government may have certain rights in this invention.

FIELD OF THE INVENTION

The present invention generally relates to atomic vapor cells and systems containing atomic vapor cells. The present invention also generally relates to interior coatings for atomic vapor-cell systems.

BACKGROUND OF THE INVENTION

Alkali vapor cells have been used extensively since the 1960s in the study of light-atom interactions. Vapor-cell applications, both proposed and realized, include atomic clocks, communication system switches and buffers, single-photon generators and detectors, gas-phase sensors, nonlinear frequency generators, and precision spectroscopy instrumentation. However, most of these applications, and cold-atom systems in general, have only been created in laboratory settings.

Macroscale vapor cells are widely used in macroscale atomic clocks and as spectroscopy references. Macroscale vapor cells are typically 10-100 $cm^3$ in volume, which is insignificant for $m^3$ scale atomic clocks, but far too large for chip-scale atomic clocks which are at most a few $cm^3$ in volume.

A key driver has thus been to reduce vapor-cell size. Traditional vapor-cell systems are large and, if they have thermal control, have many discrete components and consume a large amount of power. To realize the full potential of vapor-cell technologies, the vapor-cell systems need to be miniaturized. Chip-scale atomic clocks and navigation systems require miniature vapor cells, typically containing cesium or rubidium, with narrow absorption peaks that are stable over time.

The amount of alkali vapor in a vapor cell changes over time as the vapor adsorbs, diffuses, and reacts with the walls. Alkali metal vapor pressure may be changed with a small set of known technologies (see Monroe et al., *Phys Rev Lett* 1990, 65, 1571; Scherer et al., *J Vac Sci & Tech A* 2012, 30; and Dugrain, *Review of Scientific Instruments* vol. 85, no. 8, p. 083112, August 2014). However, these systems are slow, complex, and/or have a short longevity.

Traditionally, alkali metals have been introduced into magneto-optical trap (MOT) vacuum systems via difficult-to-control preparation steps, such as manually crushing a sealed alkali-containing glass ampule inside a metal tube connected to the vacuum system via a control valve. See Wieman, *American Journal of Physics* vol. 63, no. 4, p. 317, 1995. This approach requires external heating to replenish the alkali metal inside the vacuum system as needed, which is a slow process with little control over the amount of alkali metal delivered. The manual labor is non-ideal for automated systems or chip-scale devices.

An alternative exists in the now-common alkali metal dispensers, which are effectively an oven-controlled source of alkali metal, whereby the desired alkali metal is released by chemical reaction when a current is passed through the device. While this process automates the release of alkali metal into the vacuum system, it has difficulty in fabrication compatibility with chip-scale cold-atom devices. Further, the timescales required for generating (warm up) and sinking (pump down) alkali are typically on the order of seconds to minutes, and can vary greatly depending on the amount of alkali metal built up on the vacuum system walls.

Double MOTs wherein the first MOT is loaded at moderate vacuum, and then an atom cloud is transferred to a second high-vacuum MOT, have been implemented on the laboratory scale. Again, these systems require complicated dual-vacuum systems and controls as well as a transfer system to move the atom cloud from one MOT to the other, none of which is amenable to chip-scale integration.

Light-induced atomic desorption is a recent technique that solves some of the long pump-down times by only releasing a small amount of alkali using a desorption laser; however, this method requires preparing a special desorption target in the MOT vacuum chamber. The desorption laser can interfere with the trapping lasers of the MOT (see Anderson et al., *Physical Review A* vol. 63, no. 2, January 2001). It also has yet to demonstrate suitable time constants below 1 second.

Thermoelectric stages can be used to regulate the overall temperature of the vapor cell, but this requires the addition of the thermoelectric stages, a temperature sensor and controller, and a significant amount of power (watts) to maintain the entire temperature of the cell at the correct temperature for MOT operation. The effectiveness of this approach will also depend on the overall size of the MOT cell and the efficiency of the thermoelectric stages, limiting the time constants at which the MOT can be loaded and the residual pressure stabilized.

An atom chip is an arrangement of microfabricated current-carrying wires patterned on a substrate which is used to trap and control atoms via the strong magnetic field gradients offered at distances close to conductors. Atoms chips enable highly sophisticated experiments to be condensed into areas on the order of a few square centimeters and readily lend themselves to the miniaturization and integration of cold atom systems for practical applications beyond the laboratory.

Atom chips use metal traces patterned via lithographic techniques to create magnetic fields involved in trapping populations of atoms. See U.S. Pat. No. 7,126,112 for "Cold atom system with atom chip wall"; Fortagh et al., *Rev. Mod. Phys.* 79, 235 (2007) Reichel et al., *Atom Chips*, Wiley, 2011; and Treutlein, *Coherent manipulation of ultracold atoms on atom chips*, Dissertation, Ludwig-Maximilians-University Munich, 2008, which are hereby incorporated by reference. Atom chips typically are implemented as one wall of a vapor cell. Thus they suffer from the same issues—such as slow vapor pressure rate of change and loss of alkali vapor to the walls—as conventional vapor cells. Improvements to conventional vapor cells in which magnetic trapping fields are generated by magnets or electromagnets outside the vapor cell also apply to atom chips for which magnetic fields are generated by magnets or electromagnets inside the vapor cell.

In uncoated atomic vapor cells under vacuum, orders of magnitude more atoms are adsorbed on solid surfaces than are present in the vapor phase. Also, interactions with vapor cell walls can limit the coherence time (or even the lifetime for unstable elements) of the atoms in the vapor.

Coatings have been applied to vapor cells in order to reduce the number of adsorbed atoms. Typical vapor cell coatings are long-chain aliphatic hydrocarbons (e.g. paraffin or octadecyltrichlorosilane). See, for example, Bouchiat and Brossel, "Relaxation of Optically Pumped Rb Atoms on Paraffin-Coated Walls", *Physical Review* 147, 41, 1996, and Yi et al., "Method for characterizing self-assembled monolayers as antirelaxation wall coatings for alkali vapor cells", *Journal of Applied Physics* 104, 023534, 2008, each of which is incorporated by reference. The processes for applying these coatings are tricky and typically leave a fraction of the wall uncoated, which limits their effectiveness in reducing the number of atoms adsorbed to cell walls. In the case of paraffin coatings, the temperature typically must remain below 50° C. As a consequence, the use of paraffin coatings in the case of alkali atoms is limited to Cs, Rb, and to a lesser extent K, which have sufficient vapor pressures for spectroscopic measurements at room temperature. See Lucchesini et al., "Low Energy Atomic Photodesorption from Organic Coatings", *Coatings* 2016, 6, 47, which is incorporated by reference.

Alumina and borosilicate glass have been known as inorganic vapor-cell surfaces that are effective for low residence times. See Stephens et al., "Study of wall coatings for vapor-cell laser traps", *Journal of Applied Physics* 76, 3479, 1994, which is incorporated by reference.

Although the need for coatings having low surface residence times for adsorbed vapor atoms has been known since the mid-1990s, no inorganic coatings better than alumina have been found to date. It is therefore desirable to provide superior, low-adsorption-energy coating materials for vapor cells.

SUMMARY OF THE INVENTION

The present invention addresses the aforementioned needs in the art, as will now be summarized and then further described in detail below.

Some variations provide an atomic vapor-cell system comprising:

(a) a vapor-cell region configured with vapor-cell walls for containing an atomic vapor; and (b) a coating disposed on at least some interior surfaces of the vapor-cell walls, wherein the coating comprises magnesium oxide, a rare earth metal oxide, or a combination thereof.

In some embodiments, the atomic vapor is actually present within the vapor-cell region. In other embodiments, the atomic vapor is not present within the vapor-cell region and is introduced at a later time, and/or was previously present and has been evacuated from the vapor-cell region.

Interior surfaces are surfaces facing the vapor-cell region. That is, the coating is disposed between the walls and the vapor-cell region that contains or may contain atomic vapor. In some embodiments, the coating is disposed on all of the interior surfaces of the vapor-cell walls. In certain embodiments, the coating is further disposed on interior, non-wall surfaces within the vapor-cell region, such as on wires or electrode layers.

In some embodiments, the coating is at least 50 wt % of magnesium oxide, a rare earth metal oxide, or a combination thereof. In certain embodiments, the coating consists essentially of magnesium oxide, a rare earth metal oxide, or a combination thereof.

When the coating contains a rare earth metal oxide, the rare earth metal oxide may be a lanthanoid oxide selected from the group consisting of lanthanum oxide, cerium oxide, praseodymium oxide, promethium oxide, samarium oxide, europium oxide, gadolinium oxide, terbium oxide, dysprosium oxide, holmium oxide, erbium oxide, thulium oxide, ytterbium oxide, and combinations thereof.

In some embodiments, the coating further comprises aluminum oxide, silicon oxide, or both aluminum oxide and silicon oxide.

In some embodiments, the coating further comprises a metal nitride, a metal carbide, a metal fluoride, or a combination thereof. For example, the coating may include a compound selected from the group consisting of aluminum nitride, calcium fluoride, barium fluoride, sodium yttrium fluoride, lithium yttrium fluoride, and combinations thereof.

In some embodiments, the atomic vapor-cell system further comprises a coating adhesion layer interposed between the coating and those interior surfaces of the vapor-cell walls that are coated. The coating adhesion layer may comprise a zero-valent version of a metal in the coating. For example, when the coating contains or consists essentially of MgO, the coating adhesion layer may contain or consist essentially of $Mg^0$ (zero-valent magnesium metal). In these or other embodiments, the coating adhesion layer may include titanium, chromium, or a combination thereof. For example, the coating adhesion layer may be a 1-10 nanometer layer of Ti and/or Cr.

Optionally, the atomic vapor-cell system is configured to allow at least one optical path through the vapor-cell region, such as one, two, or three optical paths through the vapor-cell region. In some embodiments, the coating is at least 50% transparent at a selected wavelength of light, or range of wavelengths, associated with an optical path through the vapor-cell region. In various embodiments, the coating is at least 60%, 70%, 80%, 90%, or 95% transparent at the selected wavelength or range of wavelengths. A wavelength of light for the optical path may be selected for an atomic transition of the atomic vapor.

Note that in some embodiments, portions of the coating may be opaque or have transparency less than 50%, while the overall average coating transparency is at least 50%. In other embodiments, the coating has a uniform transparency on all coated walls.

The coating is preferably thermally stable to tolerate vacuum baking processes. In some embodiments, the coating is characterized by being thermally stable for at least 32 hours at a temperature of at least 150° C.

The coating may have an average thickness from about 1 nanometer to about 100 nanometers, in some embodiments.

In some embodiments, an atom source is contained directly within the vapor-cell region. In these or other embodiments, an atom source is not contained directly within the vapor-cell region, but the atom source is in electrochemical communication with the vapor-cell region.

In some variations of the invention, the atomic vapor is actually present within the vapor-cell region. The atomic vapor may include one or more atoms selected from the group consisting of Na, K, Rb, Cs, Ca, Sr, Hg, and Yb. In these or other embodiments, the atomic vapor includes one or more diatomic vapors, such as $I_2$.

In some embodiments, the vapor-cell region further contains one or more buffer gases and/or one or more spin-exchange gases. These other gases may include, for example, $N_2$, Ar, Ne, Xe, CO, $CO_2$, $CH_4$, $NH_3$, or a combination thereof.

The atomic vapor-cell system may be sealed from the environment. In some embodiments, the atomic vapor-cell system is in a vacuum chamber, wherein the vapor-cell walls include at least one opening configured for atomic vapor conveyance by vacuum.

In some embodiments, the atomic vapor-cell system further comprises one or more devices to adjust vapor pressure of the atomic vapor within the vapor-cell region. The device may be within the vapor-cell region, wherein the device is in thermal or electrical communication with a device control means outside of the vapor-cell region, so that atomic vapor may be introduced to, or extracted from, the vapor-cell region. The device may be outside of the vapor-cell region, wherein the device is in atomic or ionic communication with the vapor-cell region, so that atoms or ions (as precursors to the atomic vapor) may be conveyed to or from the vapor-cell region.

The one or more devices (when present) to adjust vapor pressure of the atomic vapor may include an alkali dispenser. Alternatively, or additionally, the one or more devices may include a thermally controlled region of a solid phase or a liquid phase containing an element of the atomic vapor. In some embodiments, the one or more devices may include a passive or active vacuum pump configured to convey the atomic vapor into or out of the vapor-cell region. In some preferred embodiments, the one or more devices include a solid-state electrochemical device configured to convey the atomic vapor, in neutral or ionic form, into or out of the vapor-cell region. Typically, ions (of the atomic vapor) are conveyed through at least a portion of the electrochemical device, but these ions are converted to neutral atoms that are introduced into the open volume of the vapor-cell region.

In some embodiments, the atomic vapor-cell system includes a solid-state electrochemical device that includes an atom source that itself is contained within the vapor-cell region. In these or other embodiments, the atomic vapor-cell system includes a solid-state electrochemical device that includes an atom source that is spatially separated from open volume of the vapor-cell region by one or layers of electrodes and/or ion-conducting layers. In these or other embodiments, the atomic vapor-cell system includes a solid electrolyte ionic conductor and electrodes as sources and/or as sinks for the atomic vapor.

BRIEF DESCRIPTION OF THE DRAWINGS

In FIG. 1, the optical path is optional.

In FIG. 2, the optical path is optional.

DETAILED DESCRIPTION OF EMBODIMENTS OF THE INVENTION

Figure 1:
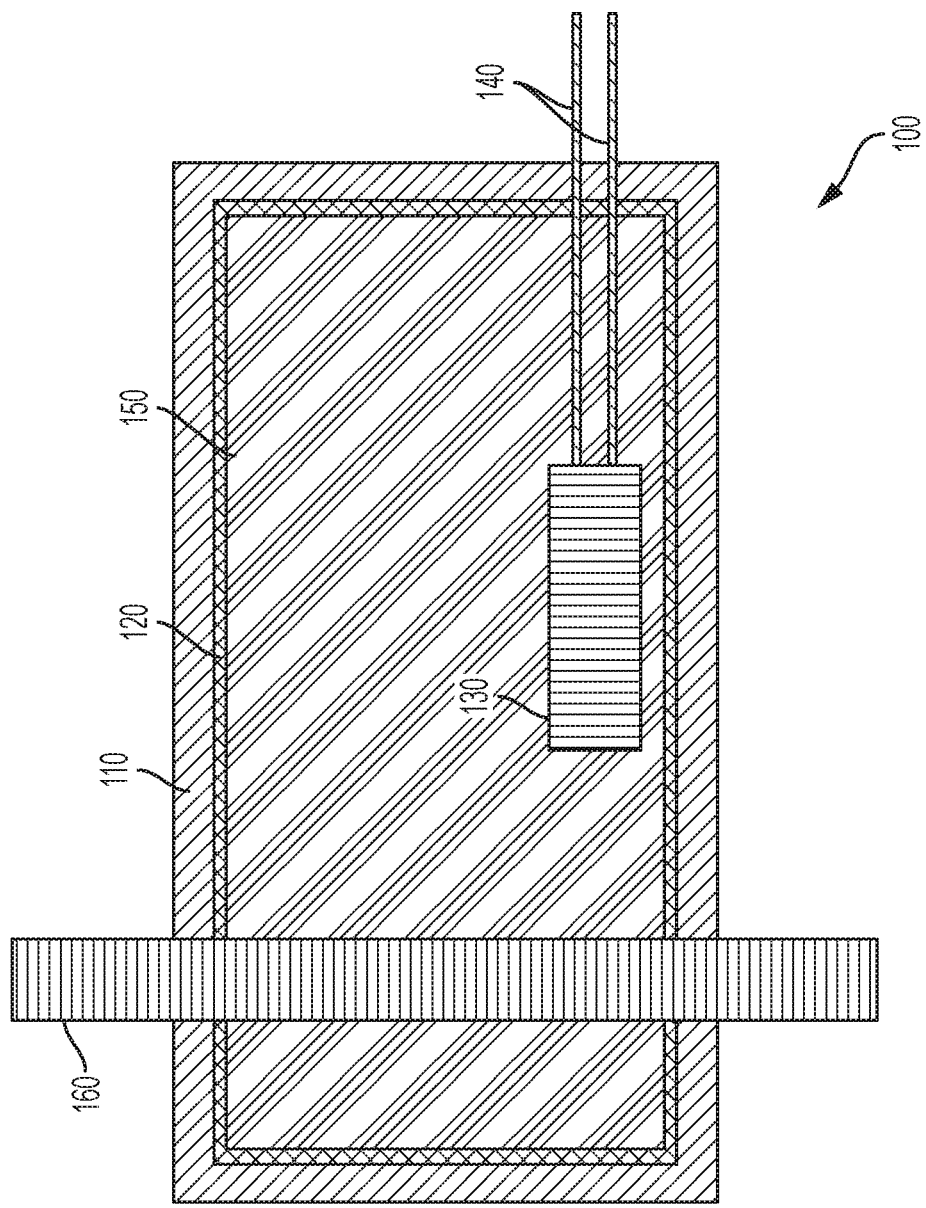
FIG. 1 is a schematic diagram depicting an exemplary atomic vapor-cell system, according to some embodiments.

The structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of this invention include a vapor cell or vacuum chamber with a conformal inorganic coating on inside surfaces of the cell. The inorganic coating preferably is fabricated from magnesium oxide or rare earth metal oxides, which have low adsorption energies for the atomic vapor element(s) inside the chamber. Magnesium oxide and rare earth metal oxides have not heretofore been employed for vapor-cell coatings. These coatings minimize the number of atoms adsorbed on solid surfaces inside a vapor cell or vacuum chamber. Additionally, the surface residence time (or surface interaction time) is reduced for atoms that adsorb onto (or interact with) vapor cell or vacuum chamber walls. The surface residence times can be reduced by orders of magnitude with these low-adsorption-energy coatings.

In uncoated atomic vapor cells under vacuum, orders of magnitude more atoms are adsorbed on solid surfaces than are present in the vapor phase. By coating the interior surfaces of the vapor cell with a coating for which the atomic vapor has low adsorption energy, the number of adsorbed atoms can be reduced by multiple orders of magnitude. As intended herein, "low adsorption energy" is preferably less than 0.5 eV, more preferably less than 0.4 eV, and most preferably less than 0.3 eV. To illustrate, without limitation, uncoated walls may have about $10^{-7}$-$10^{-8}$ adsorbed-atom monolayers while a coated wall may have less than about $3\times10^{-11}$ adsorbed-atom monolayers, for example, and preferably less than about $10^{-11}$ adsorbed-atom monolayers, due to the low adsorption energy. The ratio of adsorbed-atom monolayers for uncoated walls to coated walls may be from about 100 to about 10,000, for example, in various embodiments.

The passive low-adsorption-energy coating makes it easier to dynamically control the atomic vapor pressure within the vapor cell or vacuum chamber, because the number of atoms that need to be added or removed from the vapor cell to effect a given vapor pressure change are smaller if there are fewer atoms adsorbed to solid surfaces in equilibrium with the atoms in the vapor. A technical benefit is that greater and/or faster changes to the atomic vapor pressure can be made. Furthermore, reduced interactions with vapor cell walls can increase the coherence time of the atoms in the vapor.

Variations of this invention enable control of atomic vapor pressure within a vapor cell. This invention is applicable to portable and highly precise position, navigation, and timing systems, among others.

Some variations provide an atomic vapor-cell system comprising:

(a) a vapor-cell region configured with vapor-cell walls for containing an atomic vapor; and (b) a coating disposed on at least some interior surfaces of the vapor-cell walls, wherein the coating comprises magnesium oxide, a rare earth metal oxide, or a combination thereof, wherein the atomic vapor-cell system is optionally configured to allow at least one optical path through the vapor-cell region.

In some embodiments, the atomic vapor is actually present within the vapor-cell region. In other embodiments, the atomic vapor is not present within the vapor-cell region and is introduced at a later time, and/or was previously present and has been evacuated from the vapor-cell region.

Walls enclose the vapor-cell region, sealing it from the ambient environment. The walls may be fabricated from silicon, $SiO_2$, fused silica, quartz, borosilicate glass, soda-lime glass, metals, dielectrics, silicon carbide, aluminum nitride, calcium fluoride ($CaF_2$), barium fluoride ($BaF_2$), sodium yttrium fluoride ($NaYF_4$), lithium yttrium fluoride ($LiYF_4$), or a combination thereof, for example. At least one of the walls may include a substantially transparent portion such that there is an optical path through the vapor-cell region. A wall can be made transparent either by fabricating from an optically transparent material, or by including an optical window in a part of the wall.

At least some of the walls, or portions thereof, are coated on the interior side with the coating provided herein. Interior surfaces are surfaces facing the vapor-cell region. That is, the coating is disposed between the walls and the vapor-cell region that contains or may contain atomic vapor. In some preferred embodiments, the coating is disposed on all of the interior surfaces of the vapor-cell walls. In other embodiments, the coating is disposed on some but not all interior surfaces of the vapor-cell walls. Different compositions of coatings may be applied to different interior surfaces. In certain embodiments, the coating is further disposed on interior, non-wall surfaces within the vapor-cell region, such as on wires or electrode layers.

A "rare earth metal oxide" is a lanthanoid oxide, scandium oxide, or yttrium oxide. A "lanthanoid oxide" is an oxide of a lanthanoid metal (also referred to as a lanthanide metal).

Lanthanoid metals are the fifteen chemical elements with atomic numbers 57 through 71 in the periodic table, from lanthanum to lutetium. In particular, the lanthanoid metals are lanthanum (Ln), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), Ytterbium (Yb), and lutetium (Lu). The rare earth metals also include scandium (Sc) and yttrium (Y).

By "oxide" it is meant an oxygen-containing compound of magnesium and/or of a rare earth metal. Magnesium oxide is typically MgO but may also contain some $MgO_2$. In some embodiments, the metal oxide does not contain any atoms other than the metal and oxygen. In other embodiments, the metal oxide contains other atoms, such as H, N, or S, provided that low adsorption energy is maintained.

In some embodiments, the coating is at least 50 wt % of magnesium oxide, a rare earth metal oxide, or a combination thereof. In certain embodiments, the coating consists essentially of magnesium oxide, a rare earth metal oxide, or a combination thereof. When both magnesium oxide and one or more rare earth metal oxides are present, the mole ratio of magnesium oxide to rare earth metal oxide(s) may vary, such as from about 0.1 to about 100, e.g. about 0.2, 0.5, 1, 2, 5, 10, 20, 30, 40, or 50.

When the coating contains a lanthanoid oxide, the lanthanoid oxide may be selected from the group consisting of lanthanum oxide, cerium oxide, praseodymium oxide, promethium oxide, samarium oxide, europium oxide, gadolinium oxide, terbium oxide, dysprosium oxide, holmium oxide, erbium oxide, thulium oxide, ytterbium oxide, and combinations thereof.

Common lanthanoid oxides contain three oxygen atoms and two metal atoms (e.g., $La_2O_3$, $Yb_2O_3$, etc.). However, the oxidation states of the metal in a lanthanoid oxide may vary. For example, lanthanum oxide is typically in the form of $La_2O_3$, while cerium oxide may be present as $CeO_2$, $Ce_2O_3$, $Ce_3O_4$, or a combination thereof.

In some embodiments, the coating further comprises aluminum oxide ($Al_2O_3$), silicon oxide ($SiO_2$), or both aluminum oxide and silicon oxide. When $Al_2O_3$ and/or $SiO_2$ are present in the coating, the mole ratio of ($Al_2O_3+SiO_2$) to (magnesium oxide+rare earth metal oxides) may vary, such as from about 0.001 to about 10, e.g. about 0.01, 0.05, 0.1, 0.2, 0.5, or 1.

In some embodiments, the coating further comprises a metal nitride, a metal carbide, a metal fluoride, or a combination thereof. For example, the coating may include a compound selected from the group consisting of aluminum nitride, calcium fluoride, barium fluoride, sodium yttrium fluoride, lithium yttrium fluoride, and combinations thereof.

Some variations provide an atomic vapor-cell system comprising:

(a) a vapor-cell region configured with vapor-cell walls for containing an atomic vapor; and (b) a coating disposed on at least some interior surfaces of the vapor-cell walls, wherein the coating comprises magnesium oxide, a rare earth metal oxide, a metal nitride, a metal carbide, a metal fluoride or a combination thereof, wherein the atomic vapor-cell system is optionally configured to allow at least one optical path through the vapor-cell region.

In some embodiments, the atomic vapor-cell system further comprises a coating adhesion layer interposed between the coating and those interior surfaces of the vapor-cell walls that are coated. The coating adhesion layer may comprise a zero-valent version of a metal in the coating. For example, when the coating contains or consists essentially of MgO, the coating adhesion layer may contain or consist essentially of $Mg^0$ (zero-valent magnesium metal). In these or other embodiments, the coating adhesion layer may include titanium, chromium, or a combination thereof.

In some embodiments, the vapor cell has at least one transparent wall region to allow light into and out of the vapor cell, through an optical path. It is preferred that the optical path(s) go through the vapor cell, that is, from one wall to another wall. In some embodiments, a laser beam may enter the vapor cell, reflect off a mirrored surface inside the cell, and leave the cell through the same side that it entered. An "optical path" is the path of a spectroscopic probing beam of light (or other type of laser beam) into the vapor-cell region.

The optical path is optional. The device itself does not inherently include the beam of light. During operation of the device, in some embodiments, an optical path is at least periodically traversing into or through the vapor-cell region. Also note that an optical path is not necessarily a straight line. Internal reflectors may be included in the system, so that optical reflection occurs. In that case, the optical beam could enter and exit along the same wall (detection probe on the same side as the laser source), for example.

In some embodiments, the coating is at least 50% transparent at a selected wavelength of light, or range of wavelengths, associated with an optical path through the vapor-cell region. In various embodiments, the coating is at least 60%, 70%, 80%, 90%, or 95% transparent at the selected wavelength or range of wavelengths. In preferred embodiments, the coating is at least 90% transparent at the selected wavelength or range of wavelengths.

A wavelength of light for the optical path may be selected for an atomic transition of the atomic vapor. Exemplary atomic transitions include, but are not limited to, 795 nm for the Rb D1 line, 780 nm for the Rb D2 line, 895 nm for the Cs D1 line, and 852 nm for the Cs D2 line. Other potential atomic transitions can be found in Sansonettia et al., "Handbook of Basic Atomic Spectroscopic Data", National Institute of Standards and Technology, Gaithersburg, Md. 20899-0001, 2005, which is hereby incorporated by reference herein.

Note that in some embodiments, portions of the coating may be opaque or have transparency less than 50%, while the overall average coating transparency is at least 50%. In some embodiments, there is a certain region of coating (e.g., a transparent wall region configured for an optical path) wherein the coating transparency is at least 50%. In other embodiments, the coating has a uniform transparency on all coated walls.

The coating is preferably thermally stable to tolerate vacuum baking processes. In various embodiments, the coating is thermally stable for at least 1, 2, 4, 8, 16, 32, 64, or 128 hours at a temperature of at least 100° C., 150° C., 200° C., 250° C., 300° C., 350° C., or 400° C. In preferred embodiments, the coating is characterized by being thermally stable for at least 32 hours at a temperature of at least 150° C.

The coating may be applied via atomic layer deposition (ALD), a thin-film deposition technique based on the sequential use of a gas-phase chemical process. Atomic layer deposition can produce precise coating thicknesses (to ±1 nm or even ±0.1 nm) and uniform, high-quality coating surfaces. The quality of an ALD process can be monitored using several different imaging techniques to ensure that the ALD process is occurring smoothly and producing a conformal layer over the wall interior surface. The coating alternatively may be applied with physical vapor deposition (PVD), such as via evaporation or sputtering, chemical vapor deposition (CVD), plasma-enhanced chemical vapor deposition, or other techniques.

The coating may have an average thickness from about 1 nanometer to about 100 nanometers, in some embodiments. In various embodiments, the coating has an average thickness of about 1, 2, 5, 10, 15, 20, 25, 50, 75, or 100 nanometers. The coating thickness may vary. For example, at the interior side of a transparent wall region, the coating thickness may be relatively low, such as from 1 to 10 nanometers, while at other interior surfaces that do not require transparency, the coating thickness may be 50, 100, 200, or 500 nanometers or greater, for example.

In some embodiments (see e.g. FIG. 1), an atom source is contained directly within the vapor-cell region. In other embodiments, an atom source is not contained directly within the vapor-cell region, but the atom source is in electrochemical communication with the vapor-cell region. The electrochemical communication is described later but essentially means that electrical current may be used to cause the flow of ions of the atom source through one or more electrodes or ion-conducting layers, resulting in neutral atoms being introduced into the vapor-cell region. In certain embodiments, there are two atom sources: one contained directly within the vapor-cell region, and one that is not physically contained therein but is in electrochemical communication with the vapor-cell region.

In some variations of the invention, such as during operation, the atomic vapor is actually present within the vapor-cell region. The atomic vapor may include one or more alkali metals and/or one or more alkaline earth metals. Alkali metals include Li, Na, K, Cs, Rb, and Fr. Alkaline earth metals include Be, Mg, Ca, Sr, Ba, and Ra. The atomic vapor may include one or more atoms selected from the group consisting of Na, K, Rb, Cs, Ca, Sr, Hg, and Yb. In these or other embodiments, the atomic vapor includes one or more diatomic vapors, such as $I_2$ (gaseous iodine).

Optionally, the atomic vapor is isotopically enriched or purified. When the atomic vapor atoms are isotopically enriched, the relative abundance of the isotopes of a given element are altered, thus producing a form of the element that has been enriched in one particular isotope and depleted in its other isotopic forms. The atomic vapor atoms may be isotopically pure, in some embodiments.

Other species may be present within the vapor-cell region. In some embodiments, the vapor-cell region further contains one or more buffer gases and/or one or more spin-exchange gases. These other gases may include, for example, $N_2$, Ar, He, Ne, Xe, CO, $CO_2$, $CH_4$, $H_2$, $NH_3$, or a combination thereof. Non-metal atoms (e.g., elemental H, N, or O) may also be used as additional gases. Optionally, the other gas or gases may be isotopically enriched or purified. Any additional gas is preferably not reactive with the atomic vapor atoms.

The atomic vapor may be present in the vapor-cell region at ambient atmospheric pressure, or at a lower pressure, which may be vacuum, high vacuum, or ultra-high vacuum. In various embodiments, the pressure of the atomic vapor is about $10^5$ Pa (atmospheric pressure), $10^4$ Pa, $10^3$ Pa, $10^2$ Pa, 10 Pa, 1 Pa, $10^{-1}$ Pa, $10^{-2}$ Pa, $10^{-3}$ Pa, $10^{-4}$ Pa, $10^{-5}$ Pa, $10^{-6}$ Pa, $10^{-7}$ Pa, or lower.

The atomic vapor-cell system may include a membrane which deflects as the pressure inside the vapor cell changes. The deflection could be read out with an electrical signal (e.g. piezoelectric, capacitive, differential capacitive, etc.). The membrane could deflect as the pressure between the vapor cell and a reference cell changes. The reference cell may contain vacuum or may contain a substance in vapor-solid or vapor-liquid equilibrium such that the pressure inside the reference cell would be known by knowing the temperature of the reference cell.

The atomic vapor may be present in the vapor-cell region at various temperatures. In various embodiments, the temperature of the atomic vapor is from about −40° C. to about 350° C., such as about −40° C. to about 200° C., e.g. about 20° C. to about 120° C.

The atomic vapor-cell system may be sealed from the environment, or may at least be capable of being sealed from the environment. The vapor chamber may be hermetically sealed. The vapor chamber may also be configured in fluid communication with a larger system, which may or may not be collectively (with the vapor chamber) hermetically sealed. The larger system, for example, could be part of a high-vacuum system containing pumps, pressure/vacuum gauges, atom dispensers, getters, getter pumps, getter sources, pill sources, etc.

Figure 2:
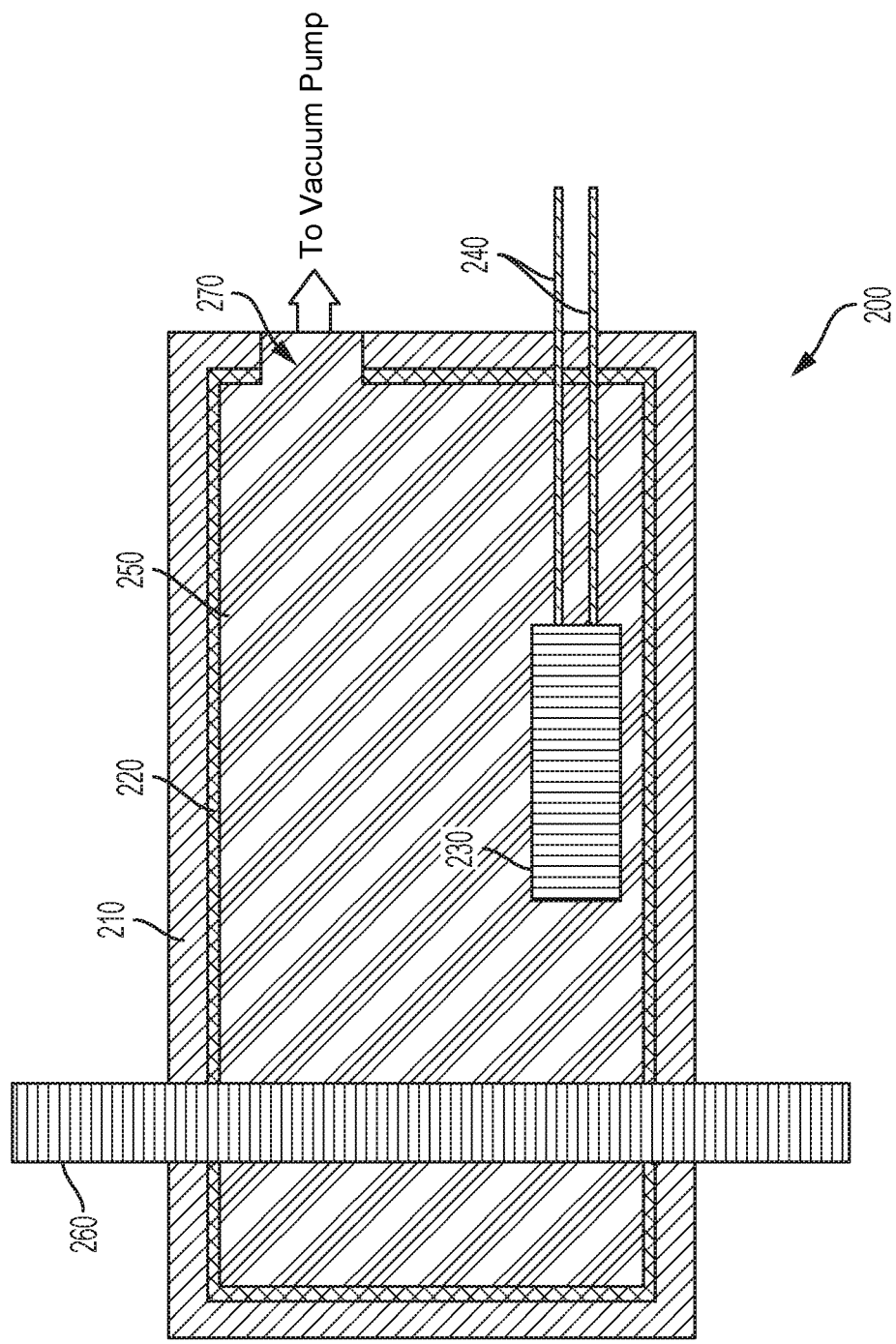
FIG. 2 is a schematic diagram depicting an exemplary atomic vapor-cell system as part of a vacuum chamber, according to some embodiments.

In some embodiments, the atomic vapor-cell system is in a vacuum chamber, wherein the vapor-cell walls include at least one opening or port configured for atomic vapor conveyance out of the vapor-cell region by vacuum (e.g., see FIG. 2). The system as a whole may be isolated from the external environment. The principles of the invention are applicable whether the atomic vapor-cell system is under vacuum or not. The coating time response can be dramatically different in a sealed vessel such as a spectroscopy vapor glass cell, compared to a continuously evacuated vacuum chamber.

In some embodiments, the atomic vapor-cell system further comprises one or more devices to adjust or control vapor pressure of the atomic vapor within the vapor-cell region. The device may be within the vapor-cell region, wherein the device is in thermal or electrical communication with a device control means outside of the vapor-cell region, so that atomic vapor may be introduced to, or extracted from, the vapor-cell region. The device may be outside of the vapor-cell region, wherein the device is in atomic or ionic communication with the vapor-cell region, so that atoms or ions (as precursors to the atomic vapor) may be conveyed to or from the vapor-cell region.

A device to adjust or control vapor pressure of the atomic vapor within the vapor-cell region may be constructed on many different length scales. For example, such a device may be in the millimeter to centimeter size range for chip-scale devices, or in the 10 cm-1 m size range for lab-scale or optical bench-scale vacuum systems. Chip-scale devices are preferably constructed using microfabrication techniques, including some or all of lithography, evaporation, shadow-masking, evaporation, sputtering, wafer bonding, die bonding, anodic bonding, glass frit bonding, metal-metal bonding, and etching.

The one or more devices (when present) to adjust vapor pressure of the atomic vapor may include an alkali dispenser. An exemplary alkali dispenser is a SAES (Società Apparecchi Electrici e Scientifici) Getter.

In some embodiments, the one or more devices may include a passive or active vacuum pump configured to convey the atomic vapor into or out of the vapor-cell region. A vacuum pump is a device that removes atomic vapor molecules from an otherwise-sealed volume in order to leave behind a partial vacuum. Exemplary vacuum pumps include, but are not limited to, turbomolecular pumps, ion pumps, getter pumps, cryopumps, rotary vane pumps, diaphragm pumps, and titanium sublimation pumps.

The one or more devices may include a thermally controlled region of a solid phase or a liquid phase containing an element of the atomic vapor. Such an element may be alloyed with other elements, or intercalated into another material, such as graphite.

In some preferred embodiments, the one or more devices include a solid-state electrochemical device configured to convey the atomic vapor, in neutral or ionic form, into or out of the vapor-cell region. The solid-state electrochemical device may include an atom source that itself is contained within the vapor-cell region, coupled with electrochemical means (e.g., electrical wires, electrodes, and/or ion-conducting layers) to controllably cause atoms to be released from the atom source, into the open volume of the vapor-cell region. In other embodiments, the solid-state electrochemical device includes an atom source (e.g., reservoir) that is not itself contained within the vapor-cell region, but is instead spatially separated from the open volume of the vapor-cell region by one or layers of electrodes and/or ion-conducting layers that may be utilized as sources or sinks of atomic vapors via electrochemical means. Various solid-state electrochemical devices and methods are described in commonly owned U.S. Pat. No. 9,763,314, issued Sep. 12, 2017; U.S. Pat. No. 10,056,913, issued Aug. 21, 2018; and U.S. patent application Ser. No. 15/639,391, filed Jun. 30, 2017, which are hereby incorporated by reference herein in their entireties.

Solid-state electrochemical devices allow direct and precise control of vapor pressure of atomic vapor atoms. Electrical inputs enable controlled dosing of metal atoms (e.g., alkali atoms) into and out of a vapor cell. Some embodiments employ a solid electrolyte ionic conductor (e.g. beta-alumina) and electrodes that may act as sources and/or as sinks for atomic vapor atoms.

In some embodiments, one or more electrodes contain an intercalable compound (e.g. graphite). Intercalable electrodes may be used as sources and/or as sinks for atomic vapor atoms, thus enabling electrical control over vapor atom content of the vapor cell. Graphite both conducts electrons and provides a high diffusivity of vapor atoms due to intercalation. By using a blanket graphite electrode, for example, the electrochemical reaction occurs across a plane instead of at a line, thus allowing substantially more of the electrolyte surface to be actively involved in the reaction. This results in orders-of-magnitude faster atomic vapor atom sourcing and sinking performance.

Some embodiments utilize a vapor-cell system comprising:

a vapor-cell region configured to allow at least one vapor-cell optical path into a vapor-cell vapor phase within the vapor-cell region;

a solid electrolyte disposed in ionic communication between the vapor-cell region and a reservoir region;

a first electrode disposed between the solid electrolyte and the vapor-cell region; and a second electrode disposed between the solid electrolyte and the reservoir region, wherein the second electrode is electrically isolated from the first electrode.

Some embodiments utilize a vapor-cell system comprising:

a vapor-cell region configured to allow at least one vapor-cell optical path into a vapor-cell vapor phase within the vapor-cell region;

at least one first electrode disposed in contact with the vapor-cell region, wherein the first electrode contains a first intercalable compound that is intercalative for at least one element (in ionic and/or neutral form);

at least one second electrode that is electrically isolated from the first electrode; and an ion-conducting layer interposed between the first electrode and the second electrode, wherein the ion-conducting layer is in ionic communication with the second electrode, and wherein the ion-conducting layer is ionically conductive for at least one ionic species.

Reference is now made to the accompanying drawings, which should not be construed as limiting the invention in any way, but will serve to illustrate some embodiments.

FIG. 1 is a schematic diagram depicting an exemplary atomic vapor-cell system 100, according to some embodiments. A population of atoms in the form of an atomic vapor is contained, or may be contained, in a vapor-cell region 150. The vapor-cell region 150 is enclosed by vapor-cell walls 110 that are themselves coated, on the interior side, with a coating 120. The coating 120 is selected for low adsorption energy of the atomic vapor. An atom source 130 is contained within the vapor-cell region 150. The atom source 130 is configured with electrical feedthroughs 140, which together with the atom source 130 form a solid-state electrochemical device. The portion of the electrical feedthroughs 140 and/or the portion of the atom source 130 that is exposed to the vapor-cell region 150 may also be coated a coating selected for low adsorption energy of the atomic vapor, which (if present) may be the same material as coating 120, or a different material. The atomic vapor-cell system 100 may be configured to allow at least one optical path 160 (optional) through the vapor-cell region 150.

FIG. 2 is a schematic diagram depicting an exemplary atomic vapor-cell system 200 as part of a vacuum chamber, according to some embodiments. A population of atoms in the form of an atomic vapor is contained, or may be contained, in a vapor-cell region 250. The vapor-cell region 250 is enclosed by vapor-cell walls 210 that are themselves coated, on the interior side, with a coating 220. The coating 220 is selected for low adsorption energy of the atomic vapor. An atom source 230 is contained within the vapor-cell region 250. The atom source 230 is configured with electrical feedthroughs 240, which together with the atom source 230 form a solid-state electrochemical device. The portion of the electrical feedthroughs 240 and/or the portion of the atom source 230 that is exposed to the vapor-cell region 250 may also be coated a coating selected for low adsorption energy of the atomic vapor, which (if present) may be the same material as coating 220, or a different material. A vacuum port 270 is in communication with a vacuum pump (not shown), to convey atomic vapor and/or residual water vapor out of the vapor-cell region 250 by vacuum. The vacuum port 270 may also be utilized to feed atomic vapor into the vapor-cell region 250 by reverse operation of the vacuum, or otherwise by pumping atomic vapor into the vapor-cell region 250. The atomic vapor-cell system 200 may be configured to allow at least one optical path 260 (optional) through the vapor-cell region 250.

For purposes of clarity, the coating 120/220 is different than the atom source 130/230 and different than the electrochemical device described above. The electrochemical device in some embodiments may be a thermally controlled region of a solid phase or a liquid phase containing an element of the atomic vapor.

For both of the systems of FIGS. 1 and 2, the coating 120/220 is a passive coating. That is, the coating 120/220 is effective—for low adsorption of atomic vapor atoms—without requiring a thermal, electrical, electrochemical, mechanical, or other active input to the coating. Once the coating 120/220 is applied, it functions for its intended purpose as long as the magnesium oxide and/or rare earth metal oxide substantially remains in the coating.

FIGS. 1 and 2 show laser beams traversing one optical path in the vapor cell. In some embodiments, there are no optical paths present. In some embodiments, two or three optical paths are present, and they may be orthogonal to each other. It shall be understood that laser beams may or may not be present in any vapor cell described in this specification. Some embodiments that utilize the coatings taught herein do not require optical paths. A source of laser beams may be present but not operating, in which case no laser beams will enter or be present within the vapor-cell region. Or a vapor cell may be provided without a source of laser beams, which source may be added at a later time, prior to operation of the vapor-cell system. Likewise, magnetic field sources (external to the device) and magnetic field lines (within the device) are not depicted in the drawings, to aid in the depiction of device features and because the magnetic field sources and lines may or may not be actually present. The magnetic field source and resulting magnetic field lines will be present when the system is used to trap a population of cold atoms, for example.

A number of variations of the system are possible.

The vapor cell may be situated inside a magnetic field. Coils of wire driven in an anti-Helmholtz configuration surrounding the vapor cell can be used to generate the magnetic fields required for an atom trap. Other magnetic-field sources (such as magnets or materials capable of generating magnetic flux) may be utilized to generate magnetic fields within the vapor-cell region. The magnetic-field source may be provided separately from the vapor cell, and these components may be assembled and disassembled from each other for various reasons.

The vapor cell may be contained within an oven. The purpose of the oven may be to control the temperature of the vapor cell at a temperature above the ambient temperature, for example. In principle, the vapor cell may be contained within any sort of temperature-controlled system, for heating or cooling the vapor cell.

A vapor-cell oven enables independent control over atomic vapor partial pressure and an optional buffer gas partial pressure in the vapor cell. In certain embodiments, the buffer gas partial pressure is controlled by the oven temperature and the atomic vapor partial pressure is controlled by a voltage and current applied across a solid electrolyte (ion-conducting layer). As conditions in the vapor cell change over time, the oven temperature can be adjusted to maintain a narrow, stable absorption peak.

The vapor-cell region may be in communication with a reservoir volume. The reservoir volume may be hermetically sealed or may be in fluid communication with a larger system. The larger system, for example, could be part of a high-vacuum system containing pumps, pressure/vacuum gauges, atom dispensers, getters, getter pumps, getter sources, pill sources, etc. The reservoir volume may contain the desired atoms in a vapor phase, a solid phase, and/or a liquid phase. See U.S. Pat. No. 10,056,913, issued Aug. 21, 2018, which is incorporated by reference.

The vapor cell may contain an atom chip for intra-system generation of magnetic fields for microtraps. An atom chip may be fabricated on a base chip that is heterogeneously integrated with a solid electrolyte on the same vapor cell face, for example. In other embodiments, an atom chip is configured outside the vapor cell.

In some embodiments, there are three orthogonal optical paths to facilitate the formation of a magneto-optical trap (MOT) or for atomic cloud imaging. The vapor-cell optical paths do not need to be orthogonal when entering the vapor cell, however. For example, there could be mirrors inside the vapor cell that make the optical paths orthogonal only inside the vapor cell. There could be one optical path entering the cell, which optical path is split within the vapor cell. In some embodiments, within the vapor cell, two optical paths (one in each direction) are located on each of the three different orthogonal axes based on the location of trapped atoms.

The low-adsorption-energy coatings provided herein allow control and fast modulation of atomic vapor density, permitting large trapped populations to be obtained during the MOT loading phase, while maintaining good (e.g., ultra-high) vacuum conditions in the following stages, and without compromising the lifetime of the cold atoms. This feature is of major importance in single-chamber setups. Fast and periodic quenching of the vapor density can be achieved.

A population of cold atoms (e.g., $10^5$ to $10^9$ atoms) at a temperature of, for example, about 0.1 µK to 1000 µK, may be prepared within the vapor-cell region. This population may be formed with a magneto-optical trap. After reducing the vapor pressure, the trap on the population of cold atoms may be released and a measurement of frequency or position may be made. After the measurement, a population of cold atoms may be re-trapped, released, and a new measurement may be made. This step may be repeated multiple times.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An atomic vapor-cell system comprising:
   (a) a vapor-cell region configured with vapor-cell walls for containing an atomic vapor; and
   (b) a coating disposed on at least some interior surfaces of said vapor-cell walls, wherein said coating comprises magnesium oxide, a rare earth metal oxide, or a combination thereof,
   wherein said coating is further disposed on interior, non-wall surfaces within said vapor-cell region.

2. The atomic vapor-cell system of claim 1, wherein said coating is disposed on all of said interior surfaces of said vapor-cell walls.

3. The atomic vapor-cell system of claim 1, wherein said coating is at least 50 wt % of said magnesium oxide, rare earth metal oxide, or combination thereof.

4. The atomic vapor-cell system of claim 1, wherein said rare earth metal oxide is selected from the group consisting of lanthanum oxide, cerium oxide, praseodymium oxide, promethium oxide, samarium oxide, europium oxide, gadolinium oxide, terbium oxide, dysprosium oxide, holmium oxide, erbium oxide, thulium oxide, ytterbium oxide, and combinations thereof.

5. The atomic vapor-cell system of claim 1, wherein said coating further comprises aluminum oxide, silicon oxide, or both aluminum oxide and silicon oxide.

6. The atomic vapor-cell system of claim 1, wherein said coating further comprises a metal nitride, a metal carbide, a metal fluoride, or a combination thereof.

7. The atomic vapor-cell system of claim 6, wherein said coating comprises a compound selected from the group consisting of aluminum nitride, calcium fluoride, barium fluoride, sodium yttrium fluoride, lithium yttrium fluoride, and combinations thereof.

8. The atomic vapor-cell system of claim 1, wherein said atomic vapor-cell system further comprises a coating adhesion layer interposed between said coating and said interior surfaces of said vapor-cell walls.

9. The atomic vapor-cell system of claim 8, wherein said coating adhesion layer comprises a zero-valent version of a metal in said coating.

10. The atomic vapor-cell system of claim 8, wherein said coating adhesion layer comprises titanium, chromium, or a combination thereof.

11. The atomic vapor-cell system of claim 1, wherein said atomic vapor-cell system is configured to allow at least one optical path through said vapor-cell region, and wherein said coating is at least 50% transparent at a selected wavelength of light associated with said optical path.

12. The atomic vapor-cell system of claim 11, wherein said selected wavelength of light is selected for an atomic transition of said atomic vapor.

13. The atomic vapor-cell system of claim 1, wherein said coating is characterized by being thermally stable for at least 32 hours at a temperature of at least 150° C.

14. The atomic vapor-cell system of claim 1, wherein said coating has an average thickness from about 1 nanometer to about 100 nanometers.

15. The atomic vapor-cell system of claim 1, wherein an atom source is contained directly within said vapor-cell region.

16. The atomic vapor-cell system of claim 1, wherein an atom source is not contained directly within said vapor-cell region, and wherein said atom source is in electrochemical communication with said vapor-cell region.

17. The atomic vapor-cell system of claim 1, wherein said atomic vapor is present within said vapor-cell region.

18. The atomic vapor-cell system of claim 17, wherein said atomic vapor includes one or more atoms selected from the group consisting of Na, K, Rb, Cs, Ca, Sr, Hg, and Yb.

19. The atomic vapor-cell system of claim 17, wherein said atomic vapor includes one or more diatomic vapors.

20. The atomic vapor-cell system of claim 1, wherein said atomic vapor-cell system is sealed from the environment.

21. The atomic vapor-cell system of claim 1, wherein said atomic vapor-cell system is in a vacuum chamber, and wherein said vapor-cell walls include at least one opening configured for atomic vapor conveyance by vacuum.

22. The atomic vapor-cell system of claim 1, said atomic vapor-cell system further comprising one or more devices to adjust vapor pressure of said atomic vapor within said vapor-cell region.

23. The atomic vapor-cell system of claim 22, wherein said one or more devices include a thermally controlled region of a solid phase or a liquid phase containing an element of said atomic vapor.

24. The atomic vapor-cell system of claim 22, wherein said one or more devices include a passive or active vacuum pump configured to convey said atomic vapor into or out of said vapor-cell region.

25. The atomic vapor-cell system of claim 22, wherein said one or more devices include a solid-state electrochemical device configured to convey said atomic vapor, in neutral or ionic form, into or out of said vapor-cell region.

26. The atomic vapor-cell system of claim 22, wherein said one or more devices include a solid-state electrochemical device that includes an atom source that itself is contained within said vapor-cell region.

27. The atomic vapor-cell system of claim 22, wherein said one or more devices include a solid-state electrochemical device that includes an atom source that is spatially separated from open volume of said vapor-cell region by one or layers of electrodes and/or ion-conducting layers.

28. The atomic vapor-cell system of claim 22, wherein said one or more devices include a solid-state electrochemical device that includes a solid electrolyte ionic conductor and electrodes as sources and/or as sinks for said atomic vapor.

* * * * *